United States Patent [19]

Murakami et al.

[11] 3,907,879
[45] Sept. 23, 1975

[54] CYCLOALKYLAMINOARYLCARBOXYLIC ACID DERIVATIVES

[75] Inventors: Masuo Murakami, Tokyo; Kazuo Kubo, Urawa; Hideki Arima, Tokyo; Kenji Sano, Omiya, all of Japan

[73] Assignee: Yamanouchi Parmaceutical Co., Ltd., Tokyo, Japan

[22] Filed: Nov. 2, 1972

[21] Appl. No.: 303,045

[30] Foreign Application Priority Data

| Nov. 25, 1971 | Japan | 46-94656 |
| Nov. 27, 1971 | Japan | 46-95428 |
| Dec. 10, 1971 | Japan | 46-100050 |
| July 31, 1972 | Japan | 47-76647 |
| Aug. 31, 1972 | Japan | 47-87307 |

[52] U.S. Cl. ............... 260/518 R; 260/295.5 R; 260/295.5 B; 260/518 A; 260/519; 424/266; 424/309

[51] Int. Cl.² ........................................ C07C 101/54

[58] Field of Search .. 260/518 R, 295.5 R, 295.5 B, 260/518 A, 519

[56] References Cited
OTHER PUBLICATIONS

Fujimura et al., Japanese Pat. No. 11,454, dated June 25, 1966, 2 Pages; Abstracted by Chem. Abstracts, Vol. 65, (10), 15, 281c–d, 11-7-66.

Fujimura et al., Japanese Pat. No. 04,102, dated February 20, 1969, 2 Pages Abstracted by Chem. Abstracts, Vol. 70 (20) 96,426n, (May 19, 1969).

Primary Examiner—Alan L. Rotman
Attorney, Agent, or Firm—Burgess, Ryan and Wayne

[57] ABSTRACT

N-(2,3-dimethylcyclohexyl)-N-methylanthranilic acid represented by the formula

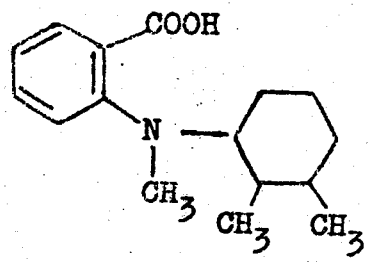

This compound has a strong analgesic activity.

4 Claims, No Drawings

CYCLOALKYLAMINOARYLCARBOXYLIC ACID DERIVATIVES

DETAILED EXPLANATION OF THE INVENTION

The present invention relates to novel cycloalkylaminoarylcarboxylic acid derivatives and more particularly, the invention relates to cycloalkylaminoarylcarboxylic acid derivatives represented by the general formula

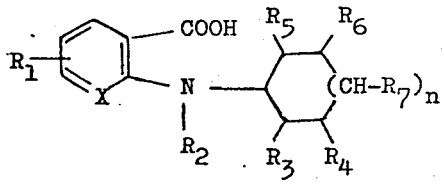

wherein X represents =CH— or =N—; $R_1$ represents a hydrogen atom, a halogen atom, a carboxyl group, a lower alkyl group, or a lower alkoxy group; $R_2$ represents a hydrogen atom, a lower alkyl group, or an aralkyl group; $R_3$, $R_4$, $R_5$, $R_6$ and $R_7$, which may be the same or different, each represents a hydrogen atom, a lower alkyl group, an aryl group, or a lower alkoxy group; any two adjacent groups among said $R_3$, $R_4$, $R_5$, $R_6$ and $R_7$ may combine to form a 2-butenediylidene group ( =CH—CH=CH—CH= ), which forms benzocycloalkane ring with a cycloalkane ring; said 2-butenediylidene group may have, as a substituent, a halogen atom, a lower alkyl group, or a lower alkoxy group; said X means =N— when said $R_2$, $R_3$, $R_4$, $R_5$, $R_6$ and $R_7$ are a hydrogen atom; said $R_5$ and $R_6$, which may be the same or different, each represents a hydrogen atom, an aryl group, or a lower alkoxy group when one of said $R_3$ and $R_4$ is a lower alkyl group and the other is a hydrogen atom; and said $R_3$ and $R_4$, which may be the same or different, each represents a hydrogen atom, an aryl group, or a lower alkoxy group when one of said $R_5$ and $R_6$ is a lower alkyl group and the other is a hydrogen atom; and $n$ represents 0 or 1.

The compounds of this invention have strong analgesic activity. In the substituents of the compounds of this invention represented by the above general formula (I), examples of the lower alkyl group include a methyl group, an ethyl group, an isopropyl group, a t-butyl group, and an amyl group; examples of the lower alkoxy group include a methoxy group, an ethoxy group, and a t-butoxy group; examples of the aralkyl group include a benzyl group, a phenethyl group, and a pyridylmethyl group; and examples of the aryl group include a phenyl group, a naphthyl group, and a pyridyl group.

As the compounds similar to the compounds of this invention, a series of compounds including the N-cyclohexylanthranilic acid derivatives represented by the formula

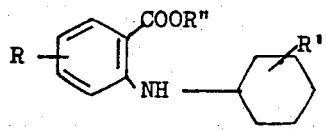

wherein R represents a hydrogen atom or an alkyl group; R' represents a hydrogen atom, an alkyl group, an aralkyl group, a $CF_3$ group, a $C_2F_5$ group or an alkoxy group; and R'' represents a hydrogen atom or an alkyl group; are disclosed in the specification of French Pat. No. 1,576,537 and further the French patent teaches that these compounds have an analgesic activity. However, the compounds disclosed practically in the French patent and corresponding to the compounds of this invention are only N-(2,5-dimethylcyclohexyl)anthranilic acid (Example 11) and N-(2-isopropyl-5-methylcyclohexyl)anthranilic acid (Example 10) represented by the formulae

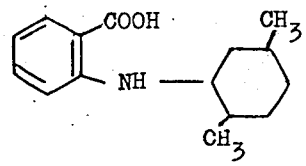

and

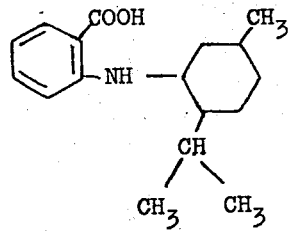

A part of the compounds of this invention represented by the aforesaid formula (I) may be known as a general conception by the above-indicated French patent (for example, the compounds of the general formula (I) in which $R_1$ is a hydrogen atom or a lower alkyl group, $R_2$ is a hydrogen atom, $R_3$, $R_4$, $R_5$, $R_6$ and $R_7$ are hydrogen atoms or some of them are a lower alkyl group or a lower alkoxy group and the others are hydrogen atoms, and $n$ is 1). However, there are no practical disclosures in the specifications of the French patent that these compounds were produced and thus the compounds of this invention are substantially novel compounds in spite of the disclosure of the French patent.

Now, the inventors have discovered that the cycloalkylaminoarylcarboxylic acid derivatives of the formula (I) are obtained by reacting an arylcarboxylic acid derivative represented by the formula

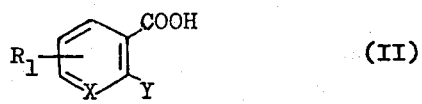

wherein $R_1$ and X are as defined above and Y represents a halogen atom;
with the cycloalkylamine derivative represented by the formula

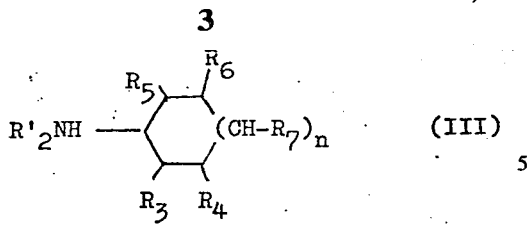

(III)

wherein $R'_2$ represents a hydrogen atom, a lower alkyl group, or an aralkyl group, and $R_3$, $R_4$, $R_5$, $R_6$, $R_7$ and $n$ are as defined above; and, if necessary, alkylating or aralkylating the product, have strong analgesic activity.

The compound of this invention can be obtained by a reaction of the compound of the formula (II) with an equimolar to excessive molar amount of a compound of the formula (III). It is preferable to conduct the reaction in the presence of an ordinary dehydrohalogenating agent and further the reaction can be promoted by adding a copper catalyst to the reaction system. As the copper catalyst to be used in this invention, there are illustrated metallic copper and such copper compounds as cuprous oxide, cupric oxide, cuprous sulfate, cuprous acetate, cuprous chloride and cupric chloride. Also, examples of suitable dehydrohalogenating agent are inorganic bases such as potassium carbonate, sodium carbonate and the like.

The presence of a solvent is not always necessary in the reaction but if desired, the reaction may be conducted in the presence of a suitable solvent such as an alcohol, dimethylformamide, diethylene glycol, and xylene. The reaction is profitably conducted under heating, for example, at temperatures of 100°– 200°C, suitably 120° – 150°C.

In addition, when compounds of the formula (III) in which $R'_2$ is a hydrogen atom is used in the reaction, the compounds of this invention represented by the formula (I) in which $R_2$ is a lower alkyl group or an aralkyl group can be obtained by alkylating or aralkylating by conventional procedures, if necessary, the product obtained in the reaction. The alkylation or the aralkylation is suitably conducted by reacting the product obtained in the aforesaid reaction with an alkyl halide, an aralkyl halide, an alkyl sulfate, etc. In addition, the methylation of the product is conducted by a conventional method, e.g., by reacting with formaldehyde in a hydrogen gas stream in the presence of a catalyst such as palladium carbon, etc.

The compounds of this invention thus obtained can be isolated and purified using conventional extraction, recrystallization, etc. procedures.

Among the starting materials used producing the compounds of this invention, some of the cycloalkylamine derivatives of the formula (III) are novel materials and they are prepared by reducing cyclohexanone oxime derivatives with metallic sodium in alcohol or by catalytically reducing aromatic amines such as aniline derivatives.

In addition, to the starting cycloalkylamine derivatives of the formula (III), there are a number of stereoisomers when at least one of the substituents $R_3$ to $R_7$ in the formula (III) is a group other than hydrogen and when each stereoisomer is used as the resulting compound starting material, the has the configuration corresponding to the stereoisomer. Also, when a mixture of the stereoisomers are used as the starting materials, a mixture of the corresponding stereoisomers of the desired products of this invention are obtained.

The compounds of this invention may also be prepared by reacting an aminoarylcarboxylic acid represented by the formula

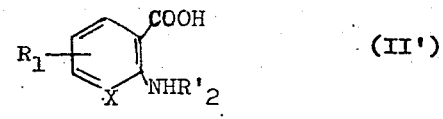

(II')

wherein $R_1$, $R'_2$ and X are as defined above; instead of a compound of the formula (II) with an equimolar to excessive molar amount of a halogenocycloalkane derivative represented by the formula

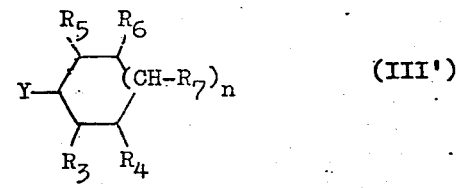

(III')

wherein $R_3$, $R_4$, $R_5$, $R_6$, $R_7$, Y and n are as defined above; instead of a compound of the formula (III) and, if necessary, alkylating or aralkylating the product as in the above indicated case.

Furthermore, the compound of this invention may be prepared also by methods other than the aforesaid methods. For example, the compounds of this invention may also be prepared by reacting an aminoarylcarboxylic acid ester represented by the formula

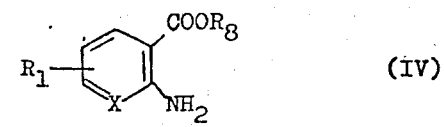

(IV)

wherein $R_1$ and X are as defined above and $R_8$ represents a protective group for the carboxylic acid, such as a methyl group, an ethyl group, an isopropyl group, a t-butyl group; with an equimolar to excessive molar amount of the cycloalkanone derivative represented by the formula

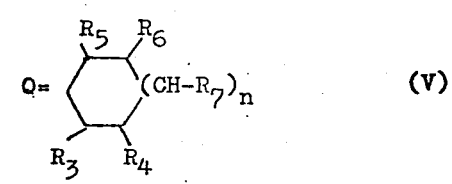

(V)

wherein $R_3$, $R_4$, $R_5$, $R_6$, $R_7$ and n are as defined above; in an anhydrous organic solvent such as anhydrous toluene, preferably in the presence of an acid catalyst such as p-toluenesulfonic acid under heating, for example, at 100°C for about 20 hours; catalytically reducing the condensation product thus obtained in an organic solvent such as methanol, dimethylformamide, etc., at normal temperature and normal pressure in the presence of a catalyst such as platinum oxide, platinum, Raney nickel, palladium carbon, rhodium platinum, etc., to form a cycloalkylaminoarylcarboxylic acid ester represented by the formula

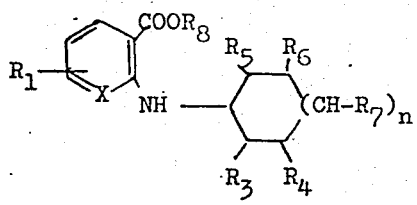

wherein $R_1$, $R_3$, $R_4$, $R_5$, $R_6$, $R_7$, $R_8$, X and $n$ are as defined above; then releasing the protective group $R_8$ of the carboxylic acid by a conventional manner, and, if necessary, alkylating or aralkylating the product as in the above indicated case.

In the following experiment, the analgesic activity of the compounds of this invention was compared with that of the known N-(2,5-dimethylcyclohexyl)anthranilic acid (this compound is described in French Pat. No. 1,576,537 indicated above).

EXPERIMENT:

Experimental procedure:

An isotonic sodium chloride solution was orally administered to a control group of eight male mice (ICR-JCL, weight between 14 and 30g) who had fasted for 20 hours and, on the other hand, a solution prepared by dispersing the test compound in an isotonic sodium chloride solution and adding thereto an aqueous sodium hydroxide solution was orally administered to an experimental group of eight male mice of the same type as above. After 30 minutes, a 0.6% aqueous acetic acid solution was administered by intraperitoneal injection to each of the mice in an amount of 10 ml/kg. Thereafter, the number of the writhings of the both hind legs was counted for 20 minutes and then the inhibition ratio was calculated by the following equation;

$$\text{Inhibition ratio (\%)} = 100 \times \left(1 - \frac{\text{writhing no. of experimental group}}{\text{writhing no. of control group}}\right)$$

The results are shown in Table 1.

Table 1

| Sample | | Dose (mg/kg) | Inhibition ratio (%) |
|---|---|---|---|
| Known compound | N-(2,5-dimethylcyclo-hexyl)anthranilic acid | 50 | 0 |
| | | 100 | 34.7 |
| Compounds of this invention | | | |
| Ex. 4 | N-(4-methylcyclohexyl)-anthranilic acid | 50 | 40.3 |
| | | 100 | 58.6 |
| Ex. 2 | N-(2-methylcyclohexyl)-anthranilic acid | 100 | 60.1 |
| Ex. 3 | N-(3-methylcyclohexyl)-anthranilic acid | 100 | 67.1 |
| Ex. 5 | N-(4-methylcyclohexyl)-N-methylanthranilic acid | 100 | 74.8 |
| Ex. 6 | N-(2,3-dimethylcyclohexyl-anthranilic acid | 50 | 75.5 |
| | | 100 | 98.7 |
| Ex. 9 | N-(2,3-dimethylcyclo-hexyl)-N-methyl-anthranilic acid | 50 | 69.0 |
| | | 100 | 97.5 |
| Ex. 23 | 2-(2,3-dimethylcyclo-hexyl)aminonicotinic acid | 50 | 49.5 |
| | | 100 | 85.6 |
| Ex. 20 | 2-cyclohexylamino-nicotinic acid | 100 | 38.6 |
| Ex. 22 | 2-(1,2,3,4-tetrahydro-1-naphthyl)aminonicotinic acid | 50 | 51.5 |
| | | 100 | 97.1 |
| Ex. 13 | N-(1-indanyl)anthranilic acid | 100 | 60.6 |
| Ex. 17 | N-(5,8-dimethyl-1,2,3,4-tetrahydro-1-naphthyl)-anthranilic acid | 50 | 62.5 |
| | | 100 | 93.9 |
| Ex. 19 | N-(7-methoxy-1,2,3,4-tetrahydro-1-naphthyl)-anthranilic acid | 100 | 55.6 |
| Ex. 18 | N-(2,3,7-trimethyl-1,2,3,4-tetrahydro-1-naphthyl)-anthranilic acid | 100 | 40.0 |
| Ex. 16 | N-(6,7-dimethyl-1,2,3,4-tetrahydro-1-naphthyl)-anthranilic acid | 100 | 48.8 |

The dosage:

The compounds of this invention are orally administered in a form of such as tablets, capsules and powder medicine. The clinical dosage of the compounds is 50 – 500 mg in a day and is given in divided doses 1 – 3 times. The doses may be adjusted depending on the conditions and ages of the patients.

Reference Example: (The method of composition)

Tablet:

| | |
|---|---|
| N-(2,3-dimethylcyclohexyl)-N-methylanthranilic acid | 25 |
| Lactose | 100 |
| Starch | 30 |
| Talc | 4 |
| Magnesium stearate | 1 |

The anthranilic acid compound was pulverized to form uniform particles. After the addition of lactose and starch, the granules were prepared by a conventional method, and after mixing the granules with talc and magnesium stearate, the tablet was formed on a 7.5 mm diameter flat punch, in a weight of 150 mg.

Powder medicine:

| | |
|---|---|
| N-(2,3-dimethylcyclohexyl)-N-methylanthranilic acid | 10 |
| Lactose | 89 |
| Magnesium stearate | 1 |

The anthranilic acid compound was pulverized to form uniform particles. After the addition of lactose and magnesium stearate to the particles, the mixture was uniformly mixed to form a powder medicine.

Capsule:

| | |
|---|---|
| N-(2,3-dimethylcyclohexyl)-N-methylanthranilic acid | 25 |
| Lactose | 125 |
| Starch | 25 |
| Talc | 5 |

The anthranilic compound was pulverized to form uniform particles. The particles were mixed with lactose, starch and talc, and then each 180 mg of the particles were filled into 4 capsules.

EXAMPLE 1

To a mixture of 15.7 g of o-chlorobenzoic acid, 13.8 g of anhydrous sodium carbonate, and 500 mg of cuprous oxide was added, one time, 15.9 g of 2,3-dimethylcyclohexylamine prepared by catalytically reducing 2,3-dimethylcyclohexanone oxime with platinum oxide in acetic acid and the reaction mixture was heated to 140° – 150°C on an oil bath with stirring. After about 30 minutes, the reaction mixture was solidified. After ice-cooling the reaction mixture, about 100 ml of diluted hydrochloric acid (pH 1) was added to the mixture and the reaction product was extracted three times each time with 30 ml of ether. The ether layer thus recovered was washed with water and after drying the layer over anhydrous magnesium sulfate, the solvent was distilled off therefrom. The residual oily material thus obtained was dissolved in an aqueous sodium carbonate solution, activated charcoal was added to the solution, and then the activated charcoal was filtered off. When the aqueous solution thus obtained was acidified by adding diluted acetic acid under cooling, precipitates were formed, which were recovered by filtration to provide 18.4 g of the white powder of N-(2,3-dimethylcyclohexyl)anthranilic acid having a melting point of 44° – 46°C.

EXAMPLES 2 – 4

By conducting the procedures similar to that in Example 1, the compounds shown in the following table were obtained.

Table 2

| Example | Compound | m.p.(°C) | Recrystallization solvent | Elemental analysis C(%) | H(%) | N(%) |
|---|---|---|---|---|---|---|
| 2 | (structure with COOH, NH-cyclohexyl-CH₃) | 144 – 148 | hexane | (Cd) 72.07<br>(Fd) 72.13 | 8.21<br>8.08 | 6.00<br>5.93 |
| 3 | (structure with COOH, NH-cyclohexyl-CH₃) | 98 – 108 | water-contg. ethanol | (Cd) 72.07<br>(Fd) 72.10 | 8.21<br>8.14 | 6.00<br>6.12 |
| 4 | (structure with COOH, NH-cyclohexyl-CH₃) | 145 – 146 | water-contg. ethanol | (Cd) 72.07<br>(Fd) 71.89 | 8.21<br>8.31 | 6.00<br>6.03 |

(Fd): found  (Cd): calculated

EXAMPLE 5

In 25 ml of acetic acid was dissolved 3.5 g of N-(4-methylcyclohexyl)-anthranilic acid prepared in Example 4, and after adding to the solution 8 ml of 37% formalin and 1.5 g of 10% palladiumcarbon, the mixture was stirred for 8 hours in a hydrogen gas stream. After filtering off the palladiumcarbon, the reaction mixture was concentrated, 20 ml of water was added to the residue formed, and then a small amount of impurities was filtered off. The solvent was distilled off from the filtrate, the residue thus formed was dissolved in ether, and the solution was dried over anhydrous sodium sulfate. Ether was distilled off from the solution and by recrystallizing the crystals thus obtained from a benzene-hexane mixture, there was obtained 2.2 g of N-(4-methylcyclohexyl)-N-methylanthranilic acid having a melting point of 123° – 125°C.

| Elemental analysis as $C_{15}H_{21}NO_2$: | | | |
|---|---|---|---|
| | C(%) | H(%) | N(%) |
| Calculated: | 72.84 | 8.56 | 5.66 |
| Found: | 72.92 | 8.55 | 5.70 |

EXAMPLE 6 a. In 35 ml of anhydrous toluene was dissolved 15.1 g of methyl anthranilate and 12.8 g of 2,3-dimethylcyclohexanone and after adding to the solution 10 mg of p-toluenesulfonic acid, the reaction mixture was refluxed for 24 hours. After cooling the reaction mixture, the solvent was distilled off and the residue was distilled to provide 19.4 g of the light yellow oil of methyl N-(2,3-dimethyl-1-cyclohexenyl)anthranilate having a boiling point of 147° – 149°C /4 mm.Hg.

| Elemental analysis as $C_{16}H_{21}NO_2$: | | | |
|---|---|---|---|
| | C(%) | H(%) | N(%) |
| Calculated: | 74.10 | 8.16 | 5.40 |
| Found: | 74.23 | 8.08 | 5.37 | b. In 50 ml of methanol was dissolved 2.6 g of methyl N-(2,3-dimethyl-1-cyclohexenyl)anthranilate and by adding to the solution 100 mg of platinum oxide, the catalytic reduction was conducted under normal temperature and pressure (15°C, 1 atm.). When the reaction system absorbed 230 ml of hydrogen, the reaction was stopped. After filtering off the catalyst and distilling off the solvent, the residue thus formed was distilled to provide 2.2 g of a light-yellow fluorescent oil of methyl N-(2,3-dimethylcyclohexyl)anthranilate having a boiling point of 153° – 156°C/3 mm.Hg.

| Elemental analysis as $C_{16}H_{23}NO_2$: | | | |
|---|---|---|---|
| | C(%) | H(%) | N(%) |
| Calculated: | 73.53 | 8.87 | 5.36 |
| Found: | 73.55 | 8.66 | 5.38 | c. In 50 ml of ethanol was dissolved 4.6 g of methyl N-(2,3-dimethylcyclohexyl)anthranilate and after adding to the solution 20 ml of 50% aqueous sodium hydroxide solution, the mixture was refluxed for 3 hours. After cooling the reaction mixture, the solvent was distilled off and then after adding water to the residue obtained, the reaction solution was acidified by the addition of diluted hydrochloric acid to precipitate crystals, which were recovered by filtration, washed with water, and then dissolved in an aqueous sodium carbonate solution. Activated charcoal was added to the solution and after filtering off the activated charcoal from the system, diluted acetic acid was added to the solution under cooling, whereby 3.5 g of the white powder of N-(2,3-dimethylcyclohexyl)anthranilic acid was obtained as precipitates. Melting point 44° – 46°C.

| Elemental analysis as $C_{15}H_{21}NO_2$: | | | |
|---|---|---|---|
| | C(%) | H(%) | N(%) |
| Calculated: | 72.84 | 8.56 | 5.66 |
| Found: | 72.90 | 8.66 | 5.69 |

EXAMPLE 7

A mixture of 3.4 g of o-chlorobenzoic acid, 3.0 g of anhydrous potassium carbonate, 0.15 g of cuprous oxide, and 4.0 g of 2,3-dimethylcyclohexylamine was heated for one hour at 150°C with stirring. The solidified reaction mixture was dissolved in ether and a 10% aqueous hydrochloric acid and then the ether layer was recovered. Activated charcoal was added to the ether layer and after filtering off the activated charcoal, the reaction product was extracted with a 2% aqueous sodium hydroxide solution. When the extract was acidified with the addition of diluted acetic acid, crystals were deposited, which were recovered by filtration to provide 2.4 g of N-(2,3-dimethylcyclohexyl)-anthranilic acid. The product, when recrystallized from water-containing ethanol, showed a melting point of 168° – 170°C.

| Elemental analysis as $C_{15}H_{21}NO_2$: | | | |
|---|---|---|---|
| | C(%) | H(%) | N(%) |
| Calculated: | 72.84 | 8.56 | 5.66 |
| Found: | 72.50 | 8.54 | 5.71 |

The 2,3-dimethylcyclohexylamine used in this example was prepared as follows: In a mixture of 185 ml of methanol and 230 ml of liquid ammonia was dissolved 29.5 g of 2,3-dimethylcyclohexanone oxime having a melting point of 106° – 108°C. and while stirring the solution under cooling at temperatures of from −35°C to −45°C, 23 g of metallic sodium was added to the solution gradually. After stirring the mixture for one hour, the mixture was heated gradually and then refluxed to remove the excess amount of ammonia. Thereafter, a 15% aqueous hydrochloric acid solution was added to the reaction mixture to acidify it sufficiently and when the greater part of methanol was distilled off under a reduced pressure, crystals were deposited. Water was added to the residue to dissolve the crystals deposited and then the solution was washed with ether. The aqueous layer formed was alkaline by the addition of a 20% aqueous sodium hydroxide solution and then the product was extracted with ether. After drying over anhydrous potassium carbonate, the ether extract was distilled to provide 19.4 g of 2,3-dimethylcyclohexylamine having a boiling point of 165° – 167°C.

EXAMPLE 8

By treating a mixture of 10 g of o-chlorobenzoic acid, 9 g of potassium carbonate, 0.3 g of cuprous oxide, and 12 g of 2,3-dimethylcyclohexylamine as in Example 7, 9 g of N-2,3-dimethylcyclohexyl)anthranilic acid was obtained.

The product, when purified from a 1% aqueous sodium hydroxide solution and a 1% aqueous hydrochloric acid solution, showed a melting point of 78° – 80°C.

| Elemental analysis as $C_{15}H_{21}NO_2$: | | | |
|---|---|---|---|
| | C(%) | H(%) | N(%) |
| Calculated: | 72.84 | 8.56 | 5.66 |
| Found: | 73.01 | 8.59 | 5.35 |

In addition, the 2,3-dimethylcyclohexylamine used in this example was prepared as follows: To a mixture of 50 g of 2,3-dimethylaniline and 50 ml of isopropanol was added 0.5 g of ruthenium oxide and the catalytic reduction was conducted at temperatures of 80° – 120°C under a hydrogen pressure of 100 – 50 kg/cm². After about one hour, the absorption of hydrogen stopped.

After filtering off the catalyst, the reaction mixture was distilled to provide 47 g ot 2,3-dimethylcyclohexylamine having a boiling point of 172° – 174°C. The 2,3-dimethylcyclohexylamine thus obtained was considered to be different in configuration from the 2,3-dimethylcyclohexylamine used in Example 7.

EXAMPLE 9

In 25 ml of acetic acid was dissolved 3.7 g of the N-(2,3-dimethylcyclohexyl)anthranilic acid prepared in Example 8 and after adding to the solution 8 ml of 37% formalin and 1.5 g of 10% palladium-carbon, the catalytic reduction was conducted. After three hours, the reaction mixture absorbed 80% of the theoretical amount of hydrogen and the reaction stopped. The catalyst was, then, filtered off and the solvent was distilled off under reduced pressure from the filtrate. To the residue were added ether and water and then the ether layer thus formed was separated. After drying the ether layer over anhydrous magnesium sulfate, ether was distilled off. When petroleum ether was added to the residue thus formed, crystals were formed, which were recovered and recrystallized from a benzene-petroleum ether mixture to provide 1.5 g of N-(2,3-dimethylcyclohexyl)-N-methylanthranilic acid having a melting point of 146° – 147°C.

| | Elemental analysis as $C_{16}H_{23}NO_2$: | | |
|---|---|---|---|
| | C(%) | H(%) | N(%) |
| Calculated: | 73.53 | 8.87 | 5.36 |
| Found: | 73.24 | 8.86 | 5.43 |

EXAMPLE 10

A mixture of 16 g of N-(2,3-dimethylcyclohexyl)-anthranilic acid prepared in Example 8, 10 g of potassium carbonate, 10.5 g of methyl iodide, 150 ml of methanol, and 30 ml of water was refluxed for 7 hours. After concentrating the reaction mixture, 50 ml of ether and 100 ml of 10% hydrochloric acid were added to the concentrate and then the mixture was stirred sufficiently. The aqueous layer thus formed was separated and further the ether layer formed was extracted twice each time with 10% hydrochloric acid. (From the ether layer, methyl N-(2,3-dimethylcyclohexyl)-anthranilate was recovered). The extract was combined with the aqueous layer recovered above and after making the mixture alkaline with a 50% aqueous potassium carbonate solution, the product was extracted with 200 ml of ethyl acetate. After drying the ethyl acetate extract over anhydrous magnesium sulfate, the extract was concentrated and when n-hexane was added to the residue formed, crystals were formed, which were recovered by filtration to provide 10.5 g of N-(2,3-dimethylcyclohexyl)-N-methylantranilic acid.

The product, when recrystallized from an ethyl acetate-n-hexane, showed a melting point of 146° – 147°C.

| | Elemental analysis as $C_{16}H_{23}NO_2$: | | |
|---|---|---|---|
| | C(%) | H(%) | N(%) |
| Calculated: | 73.53 | 8.87 | 5.36 |
| Found: | 73.78 | 9.06 | 5.59 |

EXAMPLE 11

By treating the 2,3-dimethylcyclohexylamine prepared in Example 8 in the same manner as in Example 10 an using ethyl iodide in place of methyl iodide, N-(2,3-dimethylcyclohexyl)-N-ethylanthranilic acid having a melting point of 156° – 158°C was obtained in an 18% yield.

| | Elemental analysis as $C_{17}H_{25}NO_2$: | | |
|---|---|---|---|
| | C(%) | H(%) | N(%) |
| Calculated: | 74.14 | 9.15 | 5.09 |
| Found: | 74.12 | 9.35 | 5.09 |

EXAMPLE 12

To a solution of 5 g of N-(2,3-dimethylcyclohexyl)-anthranilic acid and 4 g of potassium carbonate in 25 ml of water was added dropwise 3.3g of dimethyl sulfate with stirring at 0° – 10°C. After stirring the mixture for 2.5 hours, the reaction product was extracted with ethyl acetate and then the ethyl acetate extract was extracted twice each time with 30 ml of 10% hydrochloric acid. (By drying the ethyl acetate layer over anhydrous magnesium sulfate and distilling it, 2.6 g of methyl N-(2,3-dimethylcyclohexyl)anthranilate having a boiling point of 156° – 170°C/1 mmHg was obtained).

The above two extracts were combined with each other and after making the mixture alkaline with a 50% aqueous potassium carbonate solution, the product was extracted with ethyl acetate. After drying the extract over anhydrous sodium sulfate, the extract was concentrated and n-hexane was added to the concentrate whereby crystals were formed, which were recovered by filtration to provide 1.7 g of N-(2,3-dimethylcyclohexyl)-N-methylanthranilic acid. The product, when recrystallized from an ethyl acetate-n-hexane, showed a melting point of 146° – 147°C.

EXAMPLE 13

A mixture of 3.7 g of 1-aminoindane, 3.7 g of o-chlorobenzoic acid, 3.7 g of potassium carbonate, and 0.1 g of cupric oxide was melted by heating to 150°C with stirring. After heating the reaction mixture for a further 30 minutes, the solidified mixture was dissolved in 40 ml of 10% hydrochloric acid and ether. The ether layer thus formed was recovered and extracted with 50 ml of a 2% aqueous sodium hydroxide solution. The extract was acidified with acetic acid and the crystals thus precipitated were recovered by filtration to provide 3 g of N-(1-indanyl)anthanilic acid. The product was recrystallized from ethanol.

| Melting point 178 – 180°C. | | | |
|---|---|---|---|
| | Elemental analysis as $C_{16}H_{15}NO_2$: | | |
| | C(%) | H(%) | N(%) |
| Calculated: | 75.87 | 5.97 | 5.53 |
| Found: | 75.69 | 5.88 | 5.48 |

EXAMPLES 14 – 19

By a procedure similar to Example 13, the following compounds were prepared.

Table 3

| Example | Compound | Yield | recrystallization solvent | m.p. (°C) | | Elemental analysis C(%) H(%) N(%) | | |
|---|---|---|---|---|---|---|---|---|
| 14 | (tetrahydronaphthyl-NH-phenyl-COOH) | 44 | water-contg. ethanol | 147 – 149 | (Cd) (Fd) | 76.38 76.39 | 6.41 6.52 | 5.24 5.23 |
| 15 | (tetrahydronaphthyl-NH-phenyl-COOH) | 70 | water-contg. ethanol | 161 – 165 | (Cd) (Fd) | 76.38 76.23 | 6.41 6.36 | 5.24 5.31 |
| 16 | (dimethyl-tetrahydronaphthyl-NH-phenyl-COOH) | 35 | water-contg. ethanol | 197 – 199 | (Cd) (Fd) | 77.26 77.10 | 7.17 7.17 | 4.74 4.89 |
| 17 | (dimethyl-tetrahydronaphthyl-NH-phenyl-COOH) | 50.5 | ethanol | 214 – 215 | (Cd) (Fd) | 77.26 77.15 | 7.17 7.23 | 4.74 4.80 |
| 18 | (dimethyl-tetrahydronaphthyl-NH-phenyl-COOH) | 36 | ethanol | 191 – 195 | (Cd) (Fd) | 77.64 77.71 | 7.49 7.45 | 4.53 4.50 |
| 19 | (methoxy-tetrahydronaphthyl-NH-phenyl-COOH) | 46 | ethanol | 178 – 180 | (Cd) (Fd) | 72.71 72.80 | 6.44 6.49 | 4.71 4.70 |

*(Cd) — Calculated
(Fd) — Found
contg. — containing

EXAMPLE 20

In 15 ml of xylene were dissolved 5.0 g of 2-chloronicotinic acid and 9.5 g of cyclohexylamine and the mixture was refluxed with stirring for 3 hours. After cooling, the reaction mixture was acidified with the addition of an aqueous acetic acid and then extracted three times each time with ether. The ether extracts were combined and washed with water, dried over anhydrous magnesium sulfate, and then the ether was distilled off. The oily material thus formed was dissolved in an aqueous sodium carbonate solution and the insoluble oily materials were removed by extraction with ether. When the aqueous solution thus obtained was neutralized by the addition of an aqueous acetic acid solution under cooling, white crystals were precipitated. By recovering the crystals by filtration and washing with water followed by drying, 1.4 g of 2-cyclohexylaminonicotinic acid was obtained. Melting point 200° – 205°C.

| Elemental analysis as $C_{12}H_{16}N_2O_2$: | | |
|---|---|---|
| | C(%) H(%) | N(%) |
| Calculated: | 65.43  7.32 | 12.72 |
| Found: | 65.52  7.29 | 12.76 |

EXAMPLES 21 and 22

In a manner similar to that set forth in Example 20, the following compounds shown in Table 4 were obtained.

Table 4

| Example | Compound | m.p.(°C) | Yield (%) |
|---|---|---|---|
| 21 | (structure: pyridine-COOH with NH-cyclohexyl bearing two CH₃ groups) | 84–88 | 30.5 |
| 22 | (structure: pyridine-COOH with NH-tetrahydronaphthyl) | 201–205 | 27.5 |

| | Elemental analysis | | | |
|---|---|---|---|---|
| | C(%) | H(%) | N(%) | |
| 21 | 67.72 | 8.12 | 11.28 | Calculated |
| | 67.80 | 8.19 | 11.25 | Found |
| 22 | 71.62 | 6.01 | 10.44 | Calculated |
| | 71.56 | 6.10 | 10.42 | Found |

EXAMPLE 23

In 6 ml of xylene were dissolved 2.1 g of 2-chloronicotinic acid and 5.0 g of 2,3-dimethylcyclohexylamine and the reaction mixture was refluxed for 24 hours. After cooling, 10 ml of water was added to the reaction mixture and after adjusting the ph of the solution to 4 by adding diluted hydrochloric acid, the product was extracted three times each time with ether. The ether extracts were combined and extracted with a 1 N aqueous sodium hydroxide solution. After distilling off the ether dissolved in the aqueous layer thus formed, activated charcoal was added to the aqueous layer and after filtering off the activated charcoal, the solution was acidified by the addition of an aqueous acetic acid solution to provide 2.8 g of white crystals of 2-(2,3-dimethylcyclohexyl)aminonicotinic acid having a melting point of 95° – 98°C.

| Elemental analysis as $C_{14}H_{20}N_2O_2$: | | | |
|---|---|---|---|
| | C(%) | H(%) | N(%) |
| Calculated: | 67.71 | 8.12 | 11.28 |
| Found: | 67.58 | 8.23 | 11.31 |

The 2,3-dimethylcyclohexylamine used above was prepared by treating 2,3-dimethylcyclohexanone oxime with metallic sodium in a mixture of methanol and liquid ammonia.

EXAMPLE 24

In 6 ml of xylene were dissolved 2.1 g of 2-chloronicotinic acid and 5.0 g of 2,3-dimethylcyclohexylamine and then the solution was refluxed for 24 hours. Thereafter, in treating the reaction mixture by the same manner as in Example 23, 2.7 g of white crystals of 2-(2,3-dimethylcyclohexyl)aminonicotinic acid having a melting point of 92° – 95°C were obtained.

| Elemental analysis as $C_{14}H_{20}N_2O_2$: | | | |
|---|---|---|---|
| | C(%) | H(%) | N(%) |
| Calculated: | 67.71 | 8.12 | 11.28 |
| Found: | 67.64 | 8.20 | 11.29 |

The 2,3-dimethylcyclohexylamine used above was prepared by catalytically reducing 2,3-dimethylaniline.

EXAMPLE 25

In 5 ml of xylene were dissolved 1.7 g of 2-chloronicotinic acid and 4.6 g of N-methyl-2,3-dimethylcyclohexylamine and the solution was refluxed for 24 hours.

After cooling, 10 ml of water was added to the reaction mixture and then the ph of the solution was adjusted to 4 by adding diluted hydrochloric acid. The reaction product was extracted three times each time with ether and the ether extracts were combined and extracted with 1 N aqueous sodium hydroxide solution. After distilling off the ether dissolved in the aqueous layer thus formed, activated charcoal was added to the aqueous layer. After filtering off the activated charcoal, the solution was acidified by adding an aqueous acetic acid solution and after concentrating the solution, the product was extracted with ethyl acetate. After drying the extract over anhydrous magnesium sulfate, the solvent was distilled off. A large amount of water was added to the viscous material thus obtained and was triturated under ice-cooling. White crystals were formed. By recovering the powder, 1.9 g of 2-[N-methyl-2,3-dimethylcyclohexylamino]nicotinic acid having a melting point of 171° – 176°C was obtained.

| Elemental analysis as $C_{15}H_{22}N_2O_2$: | | | |
|---|---|---|---|
| | C(%) | H(%) | N(%) |
| Calculated: | 68.67 | 8.45 | 10.68 |
| Found: | 68.74 | 8.37 | 10.59 |

The N-methyl-2,3-dimethylcyclohexylamine used in this example was prepared in the following manner.

After dissolving in 22 g of 85% formic acid 10 g of the 2,3-dimethylcyclohexylamine used in Example 23, 32 g of acetic anhydride was added to the solution and the mixture was heated to 70°C for 5 hours.

By distilling the reaction mixture under a reduced pressure, 12 g of N-formyl-2,3-dimethylcyclohexylamine having a boiling point of 170° – 171°C/25mm.Hg was obtained. The product was dissolved in 50 ml of ether and the solution thus obtained was added dropwise to 100 ml of an ether solution containing 6 g of lithium aluminum hydride, with stirring. After refluxing the mixture for 4.5 hours, the reaction mixture was cooled and then 25 ml of a 10% aqueous sodium hydroxide solution was added dropwise to the mixture. The crystals which had formed were filtered off and the filtrate was distilled to provide 8.7 g of N-methyl-2,3-dimethylcyclohexylamine having a boiling point of 177° – 179°C.

EXAMPLE 26

A mixture of 6 g of o-chlorobenzoic acid, 6 g of potassium carbonate, 0.3 g of a copper powder, and 7.2 g of 2,5-dimethoxycyclohexylamine was stirred for one hour to 150°C. The solidified reaction mixture was dissolved in ether containing 10% hydrochloric acid and then the ether layer thus formed was recovered. Activated charcoal was added to the ether layer and after filtering off the activated charcoal, the reaction product was extracted with a 2% aqueous sodium hydroxide solution. When the extract was acidified by the addition of diluted acetic acid, crystals were formed which were recovered by filtration to provide 3 g of the light-yellow crystals of N-(2,5-dimethoxycyclohexyl)anthranilic acid. The product, when recrystallized from aqueous ethanol, showed a melting point of 168° - 169°C.

| Elemental analysis as $C_{15}H_{21}NO_4$: | | | |
|---|---|---|---|
| | C(%) | H(%) | N(%) |
| Calculated: | 64.50 | 7.58 | 5.01 |
| Found: | 64.49 | 7.69 | 5.08 |

The 2,5-dimethyoxycyclohexylamine used above was prepared by catalytically reducing 2,5-dimethoxyaniline.

EXAMPLE 27

A mixture of 2.5 g of N-(2,5-dimethoxycyclohexyl)-anthranilic acid, 1.3 g of potassium carbonate, 1.5 g of methyl iodide, 30 ml of methanol, and 15 ml of water was allowed to stand over night at room temperature and refluxed for 2 hours. Then, 1.51 g of potassium hydroxide was added to the mixture, the reaction mixture was refluxed for one hour followed by concentrating. To the residue was added 50 ml of chloroform and after stirring sufficiently, the mixture was filtered. The filtrate was concentrated and subjected to a silica gel column chromatography. The product was then developed using ethyl acetate as an elvant.

The effluent was checked by thin layer chromatography and the main fractions were collected. After distilling off the solvent, the residue was recrystallized from a benzene-hexane mixture to provide 1.2 g of white crystals of N-methyl-N-(2,5-dimethoxycyclohexyl)anthranilic acid having a melting point of 104° - 105°C.

| Elemental analysis as $C_{16}H_{23}NO_4$: | | | |
|---|---|---|---|
| | C(%) | H(%) | N(%) |
| Calculated: | 65.51 | 7.90 | 4.77 |
| Found: | 65.23 | 7.79 | 5.04 |

EXAMPLE 28

A mixture of 3.5 g of o-chlorobenzoic acid, 3.2 g of potassium carbonate, 4.0 g of trans-4-phenylcyclohexylamine, and 0.2 g of a copper powder was heated to 130° - 140°C for 30 minutes with stirring.

After cooling, 50 ml of 5% hydrochloric acid and 30 ml of ethyl acetate were added to the reaction mixture and after filtering off the insoluble material, the ethyl acetate layer was concentrated. The residue was dissolved in 300 ml of a 1% aqueous sodium hydroxide solution and after washing the solution with ether, the solution was acidified by adding acetic acid, whereby white crystals were precipitated. The crystals were recovered by filtration and recrystallized from benzene to provide 3.05 g of N-(trans-4-phenylcyclohexyl)anthanilic acid having a melting point of 201° - 204°C.

| Elemental analysis as $C_{19}H_{21}NO_2$: | | | |
|---|---|---|---|
| | C(%) | H(%) | N(%) |
| Calculated: | 77.26 | 7.17 | 4.74 |
| Found: | 77.21 | 7.19 | 4.80 |

The trans-4-phenylcyclohexylamine used above was prepared by treating 4-phenylcyclohexanone oxime with metallic sodium in boiling ethanol.

EXAMPLE 29

A mixture of 2.5 g of N-(trans-4-phenylcyclohexyl)-anthanilic acid, 1.2 g of potassium carbonate, 1.5 g of methyl iodide, 25 ml of methanol, and 12.5 ml of water was allowed to stand overnight at room temperature and refluxed for two hours. After adding to the mixture 1.42 g of potassium hydroxide and refluxing the mixture for one hour, the reaction mixture was concentrated. The residue was dissolved in water and after adjusting the ph of the solution to 8 - 9 by the addition of diluted hydrochloric acid, the reaction product was extracted with ethyl acetate. Then, the ethyl acetate solution was extracted twice with 10% hydrochloric acid. The hydrochloric acid extract was made alkaline with the addition of 50% potassium carbonate and then the product was extracted with ethyl acetate. After drying the ethyl acetate extract over anhydrous sodium sulfate, the extract was concentrated and the residue was recrystallized from an ethyl acetate-hexane mixture to provide 2.1g of white crystals of N-methyl-N-(trans4-phenylcyclohexyl)anthranilic acid having a melting point of 151° – 152–C.

| Elemental analysis as $C_{20}H_{23}NO_2$: | | | |
|---|---|---|---|
| | C(%) | H(%) | N(%) |
| Calculated: | 77.64 | 7.49 | 4.53 |
| Found: | 77.41 | 7.51 | 4.70 |

EXAMPLE 30

A mixture of 39.0 g of 2,4-dichlorobenzoic acid, 28.4 g of potassium carbonate, 1.0 g of a copper powder, and 32.4 g of 2,3-dimethylcyclohexylamine was heated to 150°C for two hours. By treating the product as in Example 26, 29 g of a white powder of 4-chloro-N-(2,3-dimethylcyclohexyl)anthranilic acid having a melting point of 150° - 153°C was obtained.

| Elemental analysis as $C_{15}H_{20}NO_2Cl$: | | | | |
|---|---|---|---|---|
| | C(%) | H(%) | N(%) | Cl(%) |
| Calculated: | 63.94 | 7.15 | 4.97 | 12.58 |
| Found: | 63.87 | 7.18 | 4.91 | 12.63 |

The 2,3-dimethylcyclohexylamine used above was prepared by catalytically reducing 2,3-dimethylaniline.

EXAMPLE 31

In 140 ml of methanol was dissolved 14 g of 4-chloro-N-(2,3-dimethylcyclohexyl)anthranilic acid and after adding to the solution 80 ml of water, 8.2 g of potassium carbonate, and 8.45 g of methyl iodide, the mixture was treated in same way as in Example 29 to provide 5.72 g of white crystals of 4-chloro-N-methyl-N-(2,3-dimethylcyclohexyl)anthranilic acid. The product, when recrystallized from ethyl acetate, showed a melting point of 154°C.

| Elemental analysis as $C_{16}H_{22}NO_2Cl$: | | | | |
|---|---|---|---|---|
| | C(%) | H(%) | N(%) | Cl(%) |
| Calculated: | 64.97 | 7.50 | 4.74 | 11.98 |
| Found: | 64.73 | 7.58 | 4.65 | 11.80 |

EXAMPLE 32 a. In 40 ml of anhydrous toluene were dissolved 17.4 g of methyl 5-methylanthranilate and 11.8 g of 2-methycyclohexanone and after adding to the solution 10 mg of p-toluenesulfonic acid, the mixture was refluxed for 20 hours. The reaction mixture was distilled under reduced pressure and the yellow oily material (11.2 g) thus obtained was dissolved in ethanol. Then, the catalytic reduction was conducted under normal temperature and normal pressure by using 0.3 g of platinum oxide until the absorption of hydrogen stopped (about 850 ml). After filtering off the catalyst and distilling off the solvent, the residue was distilled to provide 9.7 g of a yellow oil of methyl 5-methyl-N-(2-methylcyclohexyl)anthranilate having a boiling point of 150° – 157°C/1 mm.Hg.

b. In 85 ml of ethanol was dissolved 8.5 g of methyl 5-methyl-N-(2-methylcyclohexyl)anthranilate and after adding to the solution 35 ml of a 50% aqueous sodium hydroxide solution, the mixture was refluxed for 9 hours. After cooling, the solvent was distilled off and after adding water to the residue, the solution was acidified by the addition of diluted hydrochloric acid to form precipitates, which were recovered by filtration and washed with water to provide 7.5 g of a light-yellow powder of 5-methyl-N-(2-methylcyclohexyl)anthranilic acid. After dissolving the product in aqueous sodium carbonate, the product was precipitated by adding diluted acetic acid under cooling. The melting point of the product was 147° – 152°C.

| Elemental analysis as $C_{15}H_{21}NO_2$: | | | |
|---|---|---|---|
| | C(%) | H(%) | N(%) |
| Calculated: | 72.84 | 8.56 | 5.66 |
| Found: | 72.68 | 8.56 | 5.82 |

EXAMPLE 33

In 40 ml of methanol was dissolved 4.0 g of 5-methyl-N-(2-methylcyclohexyl)anthranilic acid and after adding to the solution 25 ml of water, 2.68 g of potassium carbonate, and 2.85 g of methyl iodide, the mixture was treated by in same way as in Example 29 to provide 2.45 g of white crystals of 5-N-dimethyl-N-(2-methylcylohexyl)anthranilic acid. The product, when recrystallized from ethyl acetate, showed a melting point of 144°C.

| Elemental analysis as $C_{16}H_{23}NO_2$: | | | |
|---|---|---|---|
| | C(%) | H(%) | N(%) |
| Calculated: | 73.53 | 8.87 | 5.36 |
| Found | 73.52 | 8.92 | 5.05 |

EXAMPLE 34

By treating a mixture of 5.4 g of 2-chloro-5-methoxybenzoic acid, 4.2 g of potassium carbonate, 0.3 g of a copper powder, and 7 g of 2,3-dimethylcyclohexylamine in the same way as in Example 26 and recrystallizing the product from water-containing ethanol, 3.9 g of light-yellow crystals of 5-methoxy-N-(2,3-dimethylcyclohexyl)anthranilic acid was obtained. Melting point is 174° – 176°C.

| Elemental analysis as $C_{16}H_{23}NO_3$: | | | |
|---|---|---|---|
| | C(%) | H(%) | N(%) |
| Calculated: | 69.29 | 8.36 | 5.05 |
| Found: | 69.34 | 8.46 | 5.22 |

The 2,3-dimethylcyclohexylamine used above was prepared by catalytically reducing 2,3-dimethylaniline.

EXAMPLE 35

By treating a mixture of 3.5 g of 5-methoxy-N-(2,3-dimethylcyclohexyl)anthranilic acid, 1.8 g of potassium carbonate, 2.2 g of methyl iodide, 35 ml of methanol, and 18 ml of water in the same way as in Example 29 and recrystallizing the product from hexane, 2.3 g of white crystals of 5-methoxy-N-methyl-N-(2,3-dimethylcyclohexyl)-anthranilic acid having a melting point of 109° –112°C was obtained.

| Elemental analysis as $C_{17}H_{25}NO_3$: | | | |
|---|---|---|---|
| | C(%) | H(%) | N(%) |
| Calculated: | 70.07 | 8.65 | 4.81 |
| Found: | 69.95 | 8.76 | 5.13 |

EXAMPLE 36

A mixture of 10 g of 4-bromoisophthalic acid, 7 g of potassium carbonate, 7.5 g of 4-ethylcyclohexylamine, and 20 ml of 2-ethoxy ethanol was stirred for one hour at 120° – 130°C.

After cooling the reaction mixture, 100 ml of 10% hydrochloric acid and 100 ml of ether were added thereto. After filtering off the insoluble materials, the ether layer formed was recovered and extracted with a 2% aqueous sodium hydroxide solution. The insoluble materials separated above were dissolved in a 2% aqueous sodium hydroxide solution and the solution was combined with the sodium hydroxide solution extract obtained above. The combined solution was acidified by the addition of acetic acid and the crystals thus formed were recovered by filtration to provide 3.9 g of crude crystals of 4-[N-(4-ethylcyclohexyl)amino] isophthalic acid.

The 4-ethylcyclohexylamine used above was prepared by catalytically reducing 4-ethylaniline.

EXAMPLE 37

To 3.9 g of the crude crystals of 4-[N-(4-ethylcyclohexyl)amino]isophthalic acid were added 40 ml of methanol, 20 ml of water and 4.5 g of potassium carbonate to dissolve the crystals and after adding further to the solution 3.7 g of methyl iodide, the mixture was allowed to stand overnight and then refluxed for 10 hours.

The reaction mixture was concentrated and after adding 100 ml of water to the residue and adjusting the pH of the solution to 2 to 3 by adding diluted hydrochloric acid, the reaction product was extracted with ethyl acetate.

The ethyl acetate solution was extracted with 10% hydrochloric acid and after making the extract alkaline with a 5% aqueous potassium carbonate solution, the extract was washed with ethyl acetate.

When the aqueous layer formed was acidified to 2 – 3 of pH by the addition of diluted hydrochloric acid, crystals were precipitated, which were recovered and recrystallized from ethyl acetate to provide 2.1 g of white crystals of 4-[4-ethylcyclohexyl)-N-methylamino]-isophthalic acid having a melting point of 217° – 218°C.

Elemental analysis as $C_{17}H_{23}NO_3$:

|  | C(%) | H(%) | N(%) |
|---|---|---|---|
| Calculated: | 66.86 | 7.59 | 4.59 |
| Found: | 66.67 | 7.70 | 4.52 |

EXAMPLE 38

A mixture of 1 g of N-(1,2,3,4-tetrahydro-2-naphthyl)anthranilic acid, 0.6g of potassium carbonate, 10 ml of methanol, 6 ml of water, and 0.7 g of methyl iodide was allowed to stand for two days. The reaction mixture was concentrated and after adding to the solution 10 ml of water, the product was extracted with ethyl acetate. By treating the product in the same way as in Example 29 and recrystallizing the product from ethyl acetatehexane, 0.85 g of white crystals of N-methyl-N-(1,2,3,4-tetrahydro-2-naphthyl)anthranilic acid having a melting point of 103° – 105°C were obtained.

Elemental analysis as $C_{18}H_{19}NO_2$:

|  | C(%) | H(%) | N(%) |
|---|---|---|---|
| Calculated: | 76.84 | 6.81 | 4.98 |
| Found: | 76.71 | 6.81 | 5.12 |

EXAMPLE 39

A mixture of 2.5 g of N-(2,3-dimethylcyclohexyl)-anthranilic acid, 1.7 g of potassium carbonate, 2.1 g of benzyl bromide, 25 ml of methanol, and 5 ml of water was refluxed for 15 hours. After concentrating the reaction mixture, 20 ml of ether and 40 ml of 10% hydrochloric acid were added to the concentrate and the mixture was stirred sufficiently.

The ether layer formed was separated from the aqueous layer formed and the ether layer was extracted twice with 10% hydrochloric acid, and the extracts were combined with the aqueous layer separated above. The aqueous layer was made alkaline by the addition of a 50% aqueous potassium carbonate solution and then the product was extracted with ethyl acetate.

After drying the ethyl acetate layer over anhydrous sodium sulfate, the solution was concentrated. The viscous material thus obtained was mixed with an alcoholic solution of hydrochloric acid and after distilling off the solvent, ethyl acetate was added to the residue to form crystals, which were recovered by filtration to provide 3.2 g of N-benzyl-N-(2,3-dimethylcyclohexyl)anthranilic acid. The product, when recrystallized from ethanol and a mixture of ethyl acetate and ether, showed a melting point of 161° – 163°C.

Elemental analysis as $C_{22}H_{28}NO_2Cl$:

|  | C(%) | H(%) | N(%) |
|---|---|---|---|
| Calculated: | 70.67 | 7.55 | 3.75 |
| Found: | 70.30 | 7.58 | 3.61 |

EXAMPLE 40:

A mixture of 2.47 g of N-(2,3-dimethylcyclohexyl)anthranilic acid obtained in Example 8, 1.4 g of potassium carbonate, 2.2 g of butyl iodide, 25 ml of methanol, and 14 ml of water was allowed to stand overnight at room temperature and refluxed for two hours. After adding to the mixture 1.67 g of potassium hydroxide and refluxing the mixture for one hour, the reaction mixture was concentrated. The residue was dissolved in water and after adjusting the pH of the solution to 8 – 9 by the addition of diluted hydrochloric acid, the reaction product was extracted with ethyl acetate. Then, the ethyl acetate extract was extracted twice with 10% hydrochloric acid. The hydrochloric acid extract was made alkaline by the addition of 50% potassium carbonate and then the product was extracted with ethyl acetate. After drying the ethyl acetate extract over anhydrous sodium sulfate, the extract was concentrated, and the hydrochloric-ethanol solution was added to the residue. The solution was then concentrated and this resulted in the formation of white crystals. The product was recrystallized from ethanol-ether to provide 0.8 g of white crystals of N-(2,3-dimethylcyclohexyl)-N-butyl-anthranilic acid hydrochloride having a melting point of 188° – 189°C.

Elemental analysis as $C_{19}H_{30}NO_2Cl$:

|  | C(%) | H(%) | N(%) |
|---|---|---|---|
| Calculated: | 67.14 | 8.90 | 4.12 |
| Found: | 66.80 | 9.07 | 4.27 |

EXAMPLE 41

A mixture of 4.8 g of o-chlorobenzoic acid, 4.3 g of potassium carbonate, 5.5 g of 4-(1-methylbutyl)cyclohexylamine, and 0.25 g of cuprous oxide was treated in the same way as in Example 7 to provide 2.7 g of yellow crystals of N-[4-(1-methylbutyl)cyclohexyl] anthranilic acid. The product, when recrystallized from methanol containing water, showed a melting point of 160° – 163°C.

Elemental analysis as $C_{18}H_{27}NO_2$:

|  | C(%) | H(%) | N(%) |
|---|---|---|---|
| Calculated: | 74.70 | 9.40 | 4.84 |
| Found: | 74.64 | 9.33 | 4.97 |

The 4-(1-methylbutyl)cyclohexylamine used in this example was prepared as follows:

In 240 ml of ethanol was dissolved 25 g of 4-(1-methylbutyl)cyclohexanone oxime, and 20 g of metallic sodium was added to the mixture with boiling, and the mixture was refluxed until the metallic sodium was dissolved. After cooling the reaction mixture, the mixture was acidified by addition of hydrochloric acid and concentrated. The concentrated solution was made alkaline by addition of aqueous sodium hydroxide solution and the reaction product was extracted with ether. After drying the ether extract over potassium carbonate, the solvent was distilled off the residue was distilled to provide 12 g of oily 4-(1-methylbutyl)cyclohexylamine having a boiling point of 123° – 127°C/23 mmHg.

EXAMPLE 42:

A mixture of 3.3 g of N-[4-(1-methylbutyl)cyclohexyl]anthranilic acid as obtained in Example 41, 1.6 g of potassium carbonate, 2 g of methyl iodide, 30 ml of methanol, and 15 ml of water was treated in the same way as in Example 40 to provide white crystals. The product was recrystallized from ethanol-ether to provide 2.7 g of white crystals of N-[4-(1-methylbutyl)cyclohexyl]-N-methyl anthranilic acid hydrochloride having a melting point of 148° – 150°C.

|  | Elemental analysis as $C_{19}H_{30}NO_2Cl$: | | |
|---|---|---|---|
|  | C(%) | H(%) | N(%) |
| Calculated: | 67.14 | 8.90 | 4.12 |
| Found: | 67.08 | 8.87 | 4.11 |

What is claimed is:
1. A compound of the formula

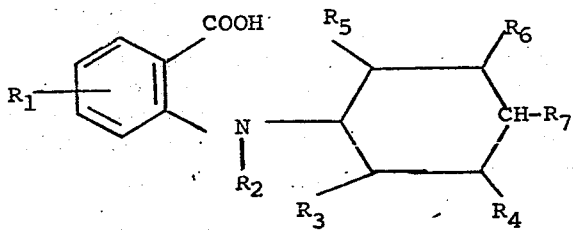

wherein $R_1$ is a member selected from the group consisting of hydrogen, halogen, lower alkyl and lower alkoxy; $R_2$ is a member selected from the group consisting of hydrogen, lower alkyl, benzyl or phenethyl; $R_3$, $R_4$, $R_5$, $R_6$ and $R_7$ are each a member selected from the group consisting of hydrogen, lower alkyl, lower alkoxy wherein at least two members of said $R_3$–$R_7$ are hydrogen and when two of said terms are ortho to one another, when taken together, represent a member selected from the group consisting of those of the formulas:

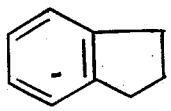 and 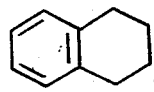.

2. N-(2,3-dimethylcyclohexyl)-N-methylanthranilic acid as claimed in claim 1.
3. N-(2,3-dimethylcyclohexyl)anthranilic acid as claimed in claim 1.
4. A cycloalkylanthranilic acid derivative according to claim 1 which is represented by the formula

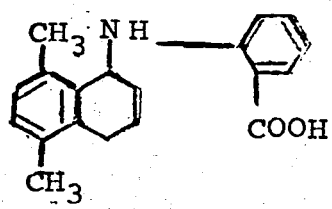

* * * * *